United States Patent
Kochura et al.

(10) Patent No.: US 10,083,155 B2
(45) Date of Patent: Sep. 25, 2018

(54) METHOD FOR DETECTING ORIGINAL LANGUAGE OF TRANSLATED DOCUMENT

(71) Applicant: International Business Machines Corporation, Armonk, NY (US)

(72) Inventors: Nadiya Kochura, Bolton, MA (US); Fang Lu, Billerica, MA (US); Sneha Palarapu, Nashua, NH (US); Tejaswini K. Ranadive, Westford, MA (US); Anupriya Ray, Nashua, NH (US)

(73) Assignee: International Business Machines Corporation, Armonk, NY (US)

( * ) Notice: Subject to any disclaimer, the term of this patent is extended or adjusted under 35 U.S.C. 154(b) by 179 days.

(21) Appl. No.: 15/156,376

(22) Filed: May 17, 2016

(65) Prior Publication Data

US 2017/0337190 A1     Nov. 23, 2017

(51) Int. Cl.
*G06F 17/22* (2006.01)
*G06F 17/27* (2006.01)
*G06F 17/28* (2006.01)

(52) U.S. Cl.
CPC ........ *G06F 17/2211* (2013.01); *G06F 17/275* (2013.01); *G06F 17/2827* (2013.01)

(58) Field of Classification Search
CPC . G06F 17/2854; G06F 17/2211; G06F 17/275
(Continued)

(56) References Cited

U.S. PATENT DOCUMENTS 8,296,124 B1   10/2012   Holsztynska et al.
8,442,965 B2   5/2013    Lopiano
(Continued)

FOREIGN PATENT DOCUMENTS

| EP | 1715413 A1 | 10/2006 |
|----|------------|---------|
| WO | 2001023900 A1 | 4/2001 |
| WO | 2013188504 A2 | 12/2013 |

OTHER PUBLICATIONS

De Jong F, et al; "Language-based multimedia information retrieval." InContent-Based Multimedia Information Access—vol. 1 Apr. 12, 2000 (pp. 713-724).

*Primary Examiner* — Paras D Shah
*Assistant Examiner* — Rodrigo Chavez
(74) *Attorney, Agent, or Firm* — North Shore Patents, P.C.; Joseph L. Acayan

(57) ABSTRACT

A system for detecting an original language of a translated document retrieves the translated document, and identifies a language of the retrieved document. The system calculates a language model for the language of the retrieved document (LM(RD)). The system calculates a distinct vector as a difference between LM(RD) and a common language model for the language of the retrieved document (LMT(RD)). The system obtains pair vectors for language model pairs associated with the language of the retrieved document, and calculates a vector distance between the distinct vector and each pair vector (or between the (LM(RD)) and each pair vector). The system identifies a given pair vector within a threshold vector distance, and calculates the confidence score. The system then identifies the original language corresponding to the given pair vector as the original language of the retrieved document, and retrieves an original document in the original language of the retrieved document.

17 Claims, 2 Drawing Sheets

(58) Field of Classification Search
USPC .............................................................. 704/8
See application file for complete search history.

(56) References Cited

U.S. PATENT DOCUMENTS

| | | |
|---|---|---|
| 2004/0107088 A1 | 6/2004 | Budzinski |
| 2004/0122656 A1 | 6/2004 | Abir |
| 2007/0288230 A1 | 12/2007 | Datta |
| 2009/0083023 A1* | 3/2009 | Foster ................. G06F 17/2827 704/3 |
| 2009/0204401 A1* | 8/2009 | Bu .......................... G10L 13/10 704/260 |
| 2011/0231423 A1 | 9/2011 | Lopiano |
| 2016/0119119 A1* | 4/2016 | Calapodescu ............ H04L 9/30 380/30 |

* cited by examiner

METHOD FOR DETECTING ORIGINAL LANGUAGE OF TRANSLATED DOCUMENT

BACKGROUND

Search engines and other very large databases can store trillion bytes of data. The same document may be stored within the database in several different languages. Often, a user may want to obtain the original (i.e., un-translated) version of the document. A translated version may contain errors or mis-translations. An original version may be necessary for various legal reasons, or a user may want to translate an original version of the document using a trusted translating method. Therefore, it would be useful to detect when a document has been translated, and to determine the original language of the translated document.

SUMMARY

According to an embodiment of the present invention, in a method for detecting an original language of a translated document, the method retrieves the translated document, and identifies a language of the retrieved document. The method calculates a language model for the language of the retrieved document (LM(RD)). The method calculates a distinct vector as a difference between LM(RD) and a common language model for the language of the retrieved document (LMT(RD)). Alternatively, the method calculates a vector distance between the (LM(RD)) and each pair vector. The method obtains pair vectors for language model pairs associated with the language of the retrieved document, and calculates a vector distance between the distinct vector and each pair vector. The method identifies a given pair vector within a threshold vector distance. The method identifies the original language corresponding to the given pair vector as the original language of the retrieved document. The method then retrieves an original document in the original language of the retrieved document where the original document was translated into the retrieved document.

In an example embodiment, the LMT(RD) is built from a corpus of non-translated documents in the language of the retrieved document.

In an example embodiment, the language model pairs are each built from a corpus of at least one of: i) non-translated documents in the language of the retrieved document, and ii) documents translated to the language of the retrieved document.

In an example embodiment, each pair vector of a given language model pair is associated with statistical probabilities of a likelihood of occurrence of one or more vocabulary entries in at least one of non-translated and translated documents.

In an example embodiment, when the method identifies the original language, the method calculates a confidence score based on the given pair vector and the threshold vector distance, and then identifies the original language based on the confidence score.

In an example embodiment, when the method calculates a confidence score, the method determines a language probability of the original language corresponding to each pair vector, and incorporates the language probability into the confidence score.

In an example embodiment, when the method calculates a confidence score, the method evaluates metadata of the retrieved document to identify data relevant to the original language. The method determines the original language of the relevant data, and incorporates the original language of the relevant data into the confidence score.

DETAILED DESCRIPTION

Figure 1:
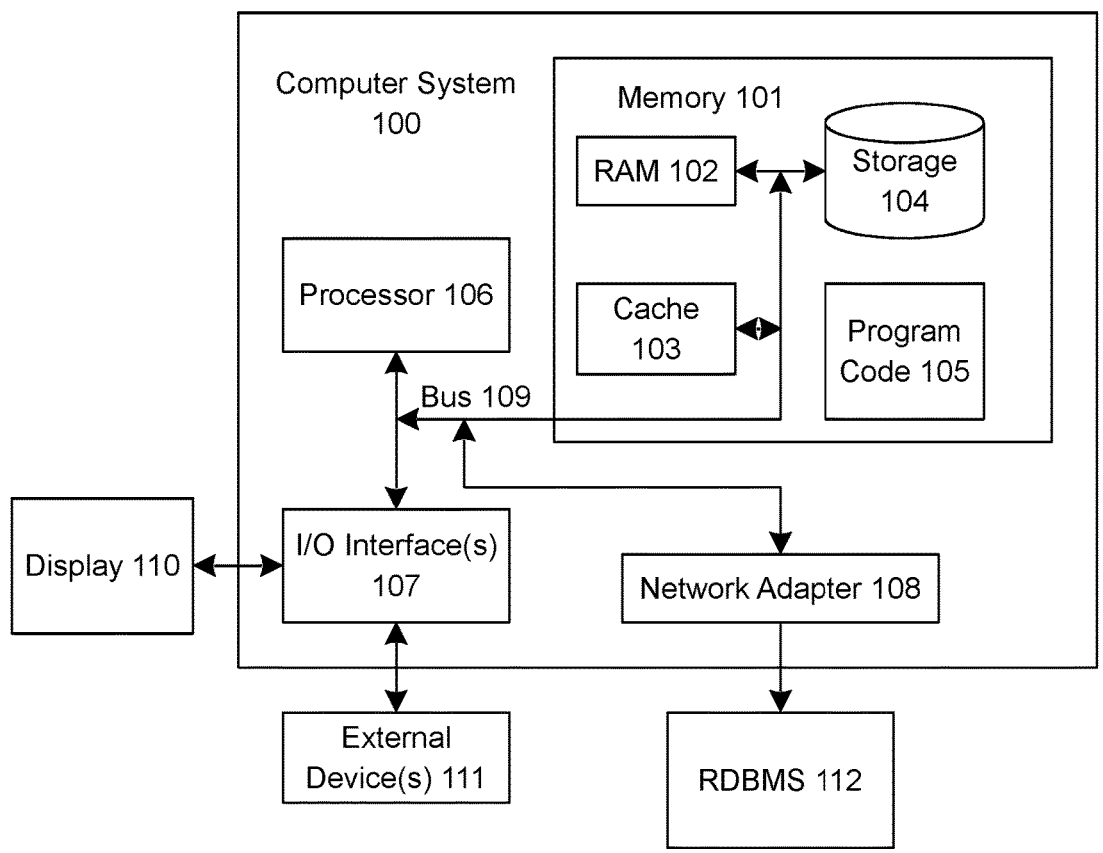
FIG. 1 illustrates an embodiment of a system for detecting an original language of a translated document, according to embodiments disclosed herein.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

FIG. 1 illustrates a system for detecting an original language of a translated document according to embodiments disclosed herein. The computer system 100 is operationally coupled to a processor or processing units 106, a memory 101, and a bus 109 that couples various system components, including the memory 101 to the processor 106. The bus 109 represents one or more of any of several types of bus structure, including a memory bus or memory controller, a peripheral bus, an accelerated graphics port, and a processor or local bus using any of a variety of bus architectures. The memory 101 may include computer readable media in the form of volatile memory, such as random access memory (RAM) 102 or cache memory 103, or non-volatile storage media 104. The memory 101 may include at least one program product having a set of at least one program code module 105 that are configured to carry out the functions of embodiment of the present invention when executed by the processor 106. The computer system 100 may also communicate with one or more external devices 111, such as a display 110, via I/O interfaces 107. The computer system 100 may communicate with one or more networks via network adapter 108. The computer system 100 may communicate with one or more databases 112 via network adapter 108.

Figure 2:
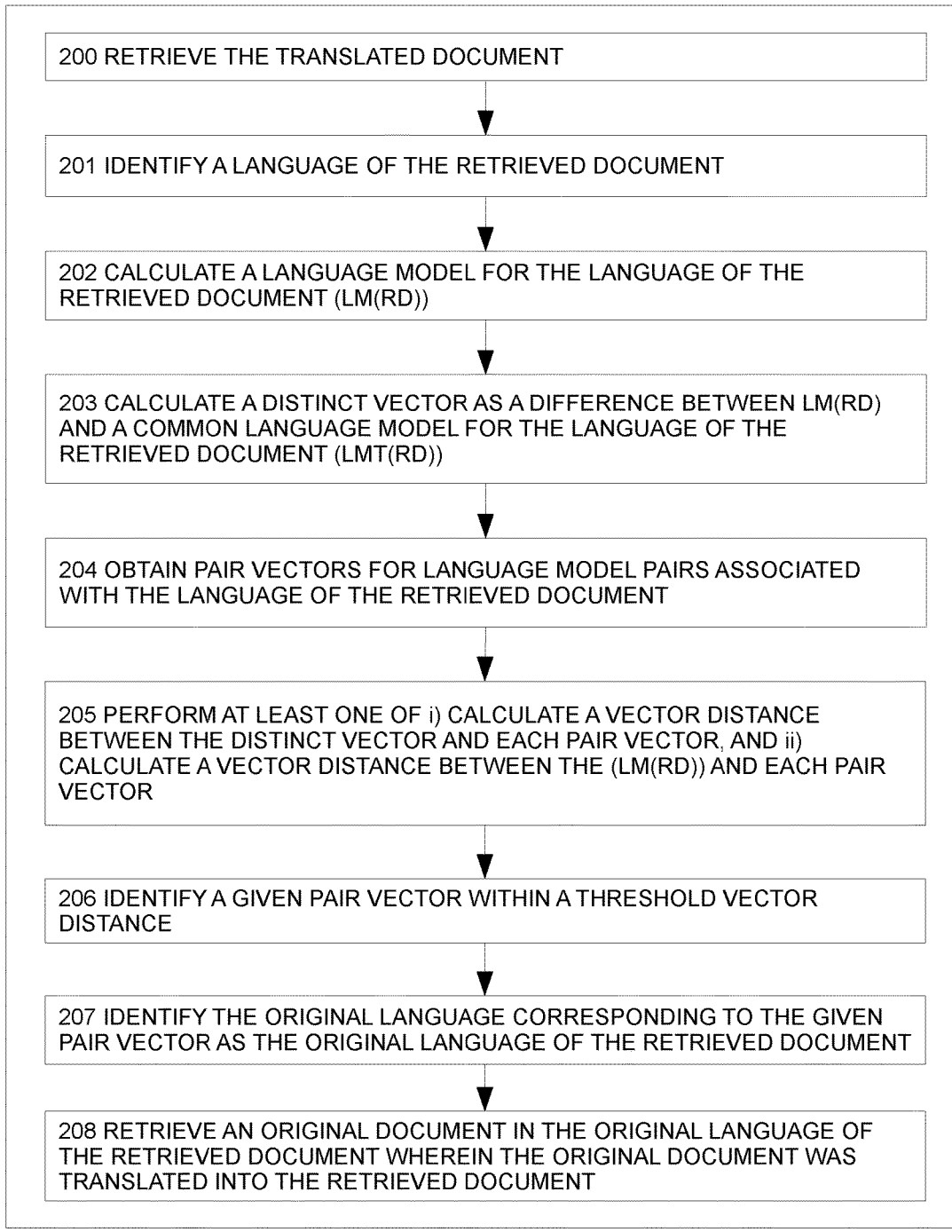
FIG. 2 is a flowchart illustrating an embodiment of a method for detecting an original language of a translated document, according to embodiments disclosed herein.

FIG. 2 illustrates an embodiment of a method for detecting an original language of a translated document. At 200, the method retrieves the translated document. In an example embodiment, the translated document may be the result of a search using a search engine. The search engine may produce several versions of the translated document. Those versions may each be in a different language, or those versions may be translated into the same language using various different translating tools. The retrieved documents may also be translated versions of translated versions (i.e., a Russian document translated into Japanese, and that Japanese document translated into English). Thus, it is important to detect the original language of the translated document to ensure that the translation was performed properly, or, if necessary, to re-translate the original document into the desired language, using a trusted translating tool.

At 201, the method identifies a language of the retrieved document. A variety of methods may be used to determine the language of the retrieved document. In an example embodiment, translation probabilities metrics are calculated to evaluate indications that the retrieved document is a translated document.

At 202, the method calculates a language model for the language of the retrieved document (LM(RD)). The language model is a statistical representation of specific language. The language model is produced from mining knowledge about the language, and analyzing that data to create the language model. Text mining techniques are applied to build language specific word association models. In an example embodiment, a count of words and/or phrases may be used for the language model metrics. In another example embodiment, the data may be normalized or a smoothing technique may be applied. The language model is a statistical representation of specific language distinguished features such as i) common words counted in translated language vs. common words counted in target language, ii) typical words sequence from translated document patterns, iii) idiom translation, and iv) language specific term that that have no equivalents in other languages. For example, the term frequency (TF) of most common words in a source language when translated into the target language can distort the TF common words statistics. In an example embodiment, the language model is implemented as follows:

Corpus Language Set LS: {l1, l2, . . . ln} (The set of languages of corpus documents.)
RD=retrieved document
LOR (RD)=language of the retrieved document
LOS (RD)=language of the source document or original language
LM (RD)=language model of the retrieved document
LMS (RD)=language model of the source document
LMT (RD)=language model of the translation target or Common language
V={w1, w2, . . . twoword_phrase1, twoword_phrase2, mword_phrase1, mword_phrase2} (The vocabulary defined for each common language where twoword_phrase is a two word phrase, and mword_phrase is a multi-word phrase.)
LM=language model (A statistical vector space model defined for a given V.)
{D}=A collection of documents The language of the retrieved document (RD) is identified as LOR (RD). The method detects the LOS (RD). In an example embodiment, it is assumed that the probability (Pi) of the word(i) is Pi=C(wi,D)/|D| where |D|=length of the D, C=count of wi, and wi=word(i). Machine learning classification algorithms are applied for training LM for each language in Language Set (LS), and for each language translation pairs. Common Language Models are built on a corpus of non-translated documents, and language pair models are built on a corpus of translated documents. In an example embodiment, the training process for a particular language starts with broadly defined vocabulary containing specific language distinguished features (as defined above). During the training process, the vocabulary entries that have the most skewed statistics are rewarded with higher weights while entries that are not statistically significant would be assigned the lower weights. The training process optimizes the vocabulary entries to reflect on the most distinguished for translation process language features. The goal of training is to produce most accurate LM vectors for classifying, at runtime, the original language of the translated document by rewarding most prominent or distinguished translation features. Typical words sequence from translated document patterns can be established and included in the language origin detection model. Idioms are language specific. Meanings and usage can be skewed during translation. For example, in Hindi, there is a common phrase which translates verbatim as, "Why is it 12:00 am on your face?". This translation makes no sense. The meaning of the phrase is, "Why do you look worried?". Translating "Why is it 12:00 am on your face?" to "Why do you look worried?" would make much more sense. Including the phrase "Why is it 12:00 am on your face?" in the Common English LM with probability=~0.0 would indicate that this is not an English phrase or idiom. Including the phrase "Why is it 12:00 am on your face?" in the Hindi-English model ~=0.3 (with much higher probability) indicates this is phrase or idiom is more likely a Hindi phrase or idiom. The probability of the phrase in the Hindu-English model (i.e., the LM of Hindi translated into English) is similar to the probability of this phrase in the Common Hindu model.

At 203, the method calculates a distinct vector as a difference between LM(RD) and a common language model for the language of the retrieved document (LMT(RD)). In an example embodiment, the LMT(RD) is built from a corpus of non-translated documents in the language of the retrieved document. For example, if the retrieved document is determined to be translated into German, then the (LM (RD)) would be created from a corpus of documents translated into German, and the common language model for the language of the retrieved document (LMT(RD)) would be created from a corpus of document written in German that had not been translated (i.e., the original source language is German). When the method determines that the retrieved document has been translated into German, the method calculates a distinct vector as a difference between the language model, LM(RD), of translated German documents, and the common language model, (LMT(RD)), for German. The language vectors indicate how frequently the words occur in the original language. Once those words are translated into a different language, those words will not have the same distribution frequency. Alternatively, the method calculates a vector distance between the (LM(RD)) and each pair vector.

At 204, the method obtains pair vectors for language model pairs associated with the language of the retrieved document. In an example embodiment, the language model pairs are each built from a corpus of non-translated documents in the language of the retrieved document, and/or documents translated to the language of the retrieved document. The method may obtain the existing machine translation algorithms and analyze the translation patterns in each language set. Each vector set is associated with statistical probabilities of concrete language to language translation within the corpus of documents. For example, pair vectors may be calculated for language translations between two languages, such as Japanese-English, Russian-English, etc. These language model pairs are based on translated documents (i.e., a Japanese document translated into English, a Russian document translated into English, etc.). In an example embodiment, vectors are trained for each language model pair by processing the corpus that includes translated and non translated (i.e., source) documents. In the process of training, the distinguished features of language representation are identified for each of the language pairs. These distinguished features of language representation are also identified when the vectors for LM(RD) and the common language model for the language of the retrieved document (LMT(RD)) are trained. The language model of the retrieved (i.e., translated) document may not be identical to the translation target or common language model. The discrepancies between the target language model and the translated language models are caused by the algorithms used to perform the translation, various degrees of similarities between languages that belong to the same or different language groups (i.e., Roman, Scandinavian, etc.), and by the specifics of each of the language representations. During the training process, the distinguished features of the translated model are statistically learned and normalized when presented in the particular language pair vector.

At 205, the method calculates a vector distance between the distinct vector and each pair vector. In effect, the method compares the text in the retrieved document with the patterns identified from analyzing the translation patterns in each of the language sets. For example, the method determines that the retrieved document has been translated into English. The method calculates a vector distance between the vector LM(RD) of the translated English document and each pair vector of Japanese-English LM (the language model of documents translated from Japanese into English), Russian-English LM (the language model of documents translated from Russian into English), etc. In other words:

Vector Distance=|LM(RD)−Japanese-English LM|

Vector Distance=|LM(RD)−Russian-English LM|

At 206, the method identifies a given pair vector within a threshold vector distance. In an example embodiment, a predetermined threshold is determined that indicates the likelihood of a match between the language of the retrieved document and an original source language. During the training process, distinct vector features are trained for one to one language association mapping, creating LMT1, LMT2, . . . LMTn vectors. Common language models (LMT) are built. The method trains the classifier model vectors to most accurately reflect the translation algorithms, language specific representations, domain specific representations, and terms. Trained vector language models reward the most prominent distinctive features for each translation pair language. When the method calculates the distinct vector |LM(RD)−LMT(RD)|, the distinct vector is matched with LM pairs LMT1, LMT2, . . . LMTn vectors to identify the LM vector pair that has the least vector distance, and identifies a vector pair that is within the threshold vector distance. The identified LM vector pair is identified as a potential original language for the retrieved document, and is assigned a confidence score.

At 207, the method identifies the original language corresponding to the given pair vector as the original language of the retrieved document. In an example embodiment, if the calculated Vector Distance=|LM(RD)−Japanese-English LM| is less than the calculated Vector Distance=|LM(RD)−Russian-English LM|, then the method determines that the original source of the retrieved document is Japanese. In other words, the retrieved document is a Japanese document that has been translated into English.

At 208, the method retrieves an original document in the original language of the retrieved document, where the original document was translated into the retrieved document. For example, once the method has determined that the retrieved document is a Japanese document translated into English, the method may search for the original Japanese document. That original Japanese document may then be translated into English, using a trusted translating tool, to produce a translated document. Often, it is important that a legal document be officially translated using a trusted translator (perhaps even a human translator) or translating tool. Also, certain information such as medical details must be translated correctly to avoid mistaken information.

In an example embodiment, each pair vector of a given language model pair is associated with statistical probabilities of a likelihood of occurrence of one or more vocabulary entries in at least one of non-translated and translated documents. For example:
Corpus LS: {English, Japanese, Russian}
The corpus includes translated documents (for example, Japanese to English, Russian to English, etc.), and common language non-translated documents (for example, English, Japanese, Russian, etc). At the training stage, the following language models are trained:
  Common LM (based on the non-translated language documents): English, Japanese, Russian
  LM pairs (based on translated documents): LM Japanese to English (Japanese-English), LM Russian to English (Russian-English).

Machine learning standard classification algorithms for building LM vectors are applied.
English LM
Vocabulary:
{"the", "a", "off", "insight", "stuff", "nice", "there is", "I want to also borrow the hands of the cat", "On the thief and the cap off", "At least count on his head Cheshi"}
{0.099, 0.089, 0.075, 0.005, 0.00067, 0.07, 0.09, 0.0, 0.0, 0.0}
Japanese-English LM
{0.0000099, 0.0000089, 0.0, 0.0, 0.00088, 0.07, 0.000009, 0.1, 0.0, 0.0}}
Russian-English LM
{0.00099, 0.00089, 0.00001, 0.0, 0.00000009, 0.07, 0.000009, 0.0, 0.1, 0.1}

Some of the phrases in the English LM make no sense. For example, a Russian idiom that means "He has an uneasy conscience that betrays itself", is translated into English by a Google translator as, "The thief has a burning hat". Another Russian idiom that means, "He's a very stubborn person" is translated into English by a Google translator as, "You can sharpen with an ax on top of this head". A Japanese idiom that means, "You're so busy that you're willing to take help from anyone" is translated into English by a Google translator as, "I want to also borrow the hands of the cat".

In an example embodiment, when the method identifies the original language, the method calculates a confidence score based on the given pair vector and the threshold vector distance. The method then identifies the original language based on the confidence score. For example, at runtime, the method retrieves the retried document (RD) by processing a query Q (for example, searching online for the retrieved document). The method identifies the retrieved document language as English. The method then builds LM using the English LM vocabulary LM(RD). In an example embodiment, the LM(RD) vector build on the English LM vocabulary set:
{0.00099, 0.00089, 0.00001, 0.01, 0.00000009, 0.007, 0.000007, 0.0, 0.01, 0.01}

The method calculates the vector distance between LM(RD) and the language pair vectors: |LM(RD)−Japanese-English LM| and |LM(RD)−Russian-English LM|. The method then identifies that the closest distance is the Russian-English LM. That distance is within the predefined threshold for Russian-English translation, and is mapped to a confidence score of 0.9. The method then outputs the language of origin (RD) as Russian with a confidence score of 0.9. The original query Q is translated in the identified original language (i.e., Russian), and run again, and used to retrieve the original document in Russian.

In an example embodiment, when the method calculates a confidence score, the method determines a language probability of the original language corresponding to each pair vector, and then incorporates the language probability into the confidence score. For example, if two vector pairs (i.e., Japanese-English LM and Russian-English LM) are both within a threshold vector distance, the method determines a language probability of the original language that corresponds to each pair vector. In this example, the method may determine that the probability that the English document (i.e., the retrieved document) was translated from Russian is higher than the probability that the English document was translated from Japanese. In an example embodiment, additional probability metrics are used to adjust the confidence score. For example, the probability of the language to language translation is calculated by evaluating the corpus of the translated documents and establishing the probability (P) of the translated documents. For each language l(i) from LS, the method calculates the P(LOS(RD)|l(i)). For example, the probability of the English-to-German translation in the selected domain can be calculated as higher than the English-to-Arabic translation.

In an example embodiment, when the method calculates a confidence score, the method evaluates metadata associated with the retrieved document to identify data that is relevant to the original language. For example, the author's last name(s), location of original publishing, images with text written in the original language, etc., might be indicators of the original language of the retrieved document. In an example embodiment, natural language processing (NPL) tags are extracted, such as "translated by", original version is", etc. The method determines the original language of the relevant data, and then incorporates the original language of the relevant data into the confidence score.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer implemented method for detecting an original language of a translated document, comprising:
    retrieving, by a processor, the translated document;
    identifying by the processor, a language of the retrieved document;
    calculating, by the processor, a language model for the language of the retrieved document (LM(RD));
    calculating, by the processor, a distinct vector as a difference between LM(RD) and a common language model for the language of the retrieved document (LMT(RD));
    obtaining, by the processor, pair vectors for language model pairs associated with the language of the retrieved document;
    calculating, by the processor, a vector distance between the distinct vector and each pair vector;
    identifying, by the processor, a given pair vector within a threshold vector distance based on the calculated vector distance;
    identifying by the processor, the original language corresponding to the given pair vector as the original language of the retrieved document; and
    retrieving, by the processor, an original document in the original language of the retrieved document, wherein the original document was translated into the retrieved document.

2. The method of claim 1, wherein the LMT(RD) is built from a corpus of non-translated documents in the language of the retrieved document.

3. The method of claim 1, wherein the language model pairs are each built from a corpus of at least one of:
    i) non-translated documents in the language of the retrieved document; and
    ii) documents translated to the language of the retrieved document.

4. The method of claim 3, wherein each pair vector of a given language model pair is associated with statistical probabilities of a likelihood of occurrence of one or more vocabulary entries in at least one of non-translated and translated documents.

5. The method of claim 1 wherein identifying the original language comprises:
    calculating a confidence score based on the given pair vector and the threshold vector distance; and
    identifying the original language based on the confidence score.

6. The method of claim 5 wherein calculating a confidence score comprises:
    determining a language probability of the original language corresponding to each pair vector; and
    incorporating the language probability into the confidence score.

7. The method of claim 5 wherein calculating a confidence score comprises:
    evaluating metadata of the retrieved document to identify data relevant to the original language;
    determining the original language of the relevant data; and
    incorporating the original language of the relevant data into the confidence score.

8. A computer program product for detecting an original language of a translated document, the computer program product comprising:
    a computer readable storage medium having computer readable program code embodied therewith, the program code executable by a computing processor to:
    retrieve the translated document;
    identify a language of the retrieved document;
    calculate a language model for the language of the retrieved document (LM(RD));
    calculate a distinct vector as a difference between LM(RD) and a common language model for the language of the retrieved document (LMT(RD));
    obtain pair vectors for language model pairs associated with the language of the retrieved document;
    calculate a vector distance between the distinct vector and each pair vector; and
    identify a given pair vector within a threshold vector distance based on the calculated vector distance;
    identify the original language corresponding to the given pair vector as the original language of the retrieved document; and
    retrieve an original document in the original language of the retrieved document, wherein the original document was translated into the retrieved document.

9. The computer program product of claim 8 further configured wherein the LMT(RD) is built from a corpus of non-translated documents in the language of the retrieved document.

10. The computer program product of claim 8 further configured wherein the language model pairs are each built from a corpus of at least one of:
    i) non-translated documents in the language of the retrieved document; and
    ii) documents translated to the language of the retrieved document.

11. The computer program product of claim 10 further configured wherein each pair vector of a given language model pair is associated with statistical probabilities of a likelihood of occurrence of one or more vocabulary entries in at least one of non-translated and translated documents.

12. The computer program product of claim 8 wherein the computer readable program code configured to identify the original language is further configured to:
  calculate a confidence score based on the given pair vector and the threshold vector distance; and
  identifying the original language based on the confidence score.

13. The computer program product of claim 12 wherein the computer readable program code configured to calculate a confidence score is further configured to:
  determine a language probability of the original language corresponding to each pair vector; and
  incorporate the language probability into the confidence score.

14. The computer program product of claim 12 wherein the computer readable program code configured to calculate a confidence score is further configured to:
  evaluate metadata of the retrieved document to identify data relevant to the original language;
  determine the original language of the relevant data; and
  incorporate the original language of the relevant data into the confidence score.

15. A system comprising:
  a computing processor; and
  a computer readable storage medium operationally coupled to the processor, the computer readable storage medium having computer readable program code embodied therewith to be executed by the computing processor, the computer readable program code configured to:
  retrieve the translated document;
  identify a language of the retrieved document;
  calculate a language model for the language of the retrieved document (LM(RD));
  calculate a distinct vector as a difference between LM(RD) and a common language model for the language of the retrieved document (LMT(RD));
  obtain pair vectors for language model pairs associated with the language of the retrieved document;
    calculate a vector distance between the distinct vector and each pair vector;
  identify a given pair vector within a threshold vector distance based on the calculated vector distance;
  identify the original language corresponding to the given pair vector as the original language of the retrieved document; and
  retrieve an original document in the original language of the retrieved document, wherein the original document was translated into the retrieved document.

16. The system of claim 15 wherein the computer readable program code configured to identify the original language is further configured to:
  calculate a confidence score based on the given pair vector and the threshold vector distance; and
  identifying the original language based on the confidence score.

17. The system of claim 16 wherein the computer readable program code configured to calculate a confidence score is further configured to:
  evaluate metadata of the retrieved document to identify data relevant to the original language;
  determine the original language of the relevant data; and
  incorporate the original language of the relevant data into the confidence score.

* * * * *